US007931439B2

(12) United States Patent
Bahadir

(10) Patent No.: US 7,931,439 B2
(45) Date of Patent: Apr. 26, 2011

(54) COAXIAL ROTOR SYSTEM FOR HELICOPTERS

(76) Inventor: Fuat Bahadir, Omaha, NE (US)

( * ) Notice: Subject to any disclaimer, the term of this patent is extended or adjusted under 35 U.S.C. 154(b) by 831 days.

(21) Appl. No.: 11/985,394

(22) Filed: Nov. 15, 2007

(65) Prior Publication Data

US 2009/0129929 A1    May 21, 2009

(51) Int. Cl.
*F01D 5/02* (2006.01)
(52) U.S. Cl. ........ 416/128; 416/129; 416/136; 416/172; 416/179; 416/189
(58) Field of Classification Search .................. 416/128, 416/129, 134 A, 136, 141, 172, 157 B, 179, 416/189
See application file for complete search history.

(56) References Cited

U.S. PATENT DOCUMENTS

| 2,425,904 | A | * | 8/1947 | Vernon | ......................... 416/171 |
| 2,478,206 | A | * | 8/1949 | Redding | ..................... 60/226.1 |
| 2,835,332 | A | * | 5/1958 | Fry | ............................... 416/128 |
| 3,830,587 | A | * | 8/1974 | Shipes et al. | .................. 415/130 |
| 4,767,270 | A | * | 8/1988 | Seidel | ........................... 416/129 |

* cited by examiner

Primary Examiner — Igor Kershteyn
(74) Attorney, Agent, or Firm — Stinson Morrison Hecker LLP

(57) ABSTRACT

An improved coaxial rotor assembly for a helicopter includes an upper rotor system having a multiple of upper rotor blades each having outer tips and mounted on and extending outwards from a central rotor shaft and a lower rotor system having a multiple of lower rotor blades each having outer tips and mounted on and extending outwards from the central rotor shaft with the upper rotor system spaced an axial distance from the lower rotor system on the central rotor shaft. A rotor blade support ring extends circumferentially around each of the upper and lower rotor systems which movably engages and supports the outer tips of the upper and lower rotor blades in spaced apart relation such that the upper and lower rotor systems rotate in opposite directions and the rotor blade support ring means prevents contact between the upper and lower rotor systems during operation thereof.

16 Claims, 7 Drawing Sheets

COAXIAL ROTOR SYSTEM FOR HELICOPTERS

BACKGROUND OF THE INVENTION

1. Technical Field

The present invention relates generally to improved rotor designs for helicopters and, more particularly, to an improved coaxial rotor system for helicopters which includes an upper rotor system having a plurality of upper rotor blades which are mounted on and extend outwards from a central rotor shaft, a lower rotor system having a plurality of lower rotor blades extending outwards from and connected to the central rotor shaft and rotating in a direction opposite the upper rotor system, the upper rotor system spaced an axial distance from the lower rotor system, and a circumferential rotor blade support ring which extends around the upper and lower rotor systems and engages the outer ends of each of the upper and lower rotor blades in generally parallel travel planes thereby preventing engagement of the upper rotor system with the lower rotor system during operation of the helicopter.

2. Description of the Prior Art

There are many different types of helicopters which are currently in use, including single rotor helicopters, dual rotor helicopters, transverse rotor helicopters, and several other related helicopter-type rotor-based flying aircraft. However, among the different types of helicopters currently being used, it has been found that those with dual rotors are among the most versatile, due to their increased lifting capacity from the increased air flow resulting from the two rotors being used on the aircraft. Primarily, there are three common configurations of dual rotor helicopters which utilize the contra-rotating effect to benefit the rotor craft, the first being a twin rotor design which includes two rotors mounted on the aircraft, one mounted behind the other, the second being intermeshing rotors which are mounted close to each other with the rotor blades intermeshing over the top of the aircraft, and finally a coaxial rotor design which includes two rotors mounted one above the other on the same rotational axis. It has further been found that the coaxial rotor system is generally more cost-effective, as the size of the helicopter does not have to be expanded to accommodate the position of the two rotors as they are positioned one atop another. A further benefit of the coaxial rotor design is that, in forward flight, the lift provided by the advancing ends of each rotor compensates for the retreating half of the other, eliminating one of the key effects of dissymmetry of lift, namely retreating blade stall.

Unfortunately, however, coaxial rotors have several disadvantages which must be addressed in order to permit the coaxial rotor system to function properly. For example, there is an increased mechanical complexity of the rotor system due to the required linkages and swash plates for a dual coaxial rotor system. Furthermore, because each rotor system needs to be turned in an opposite direction, the central rotor shaft or mast itself is far more complex, and provisions for making pitch changes to the upper rotor system must pass through the lower rotor system. The most significant and potentially deadly problem encountered with coaxial rotor systems, however, is that during extreme aerobatic maneuvers of the helicopter, such as those encountered during combat or the like, the upper rotor system may accidentally contact the lower rotor system during operation thereof, which results in the contacting blades disintegrating due to the high rate of speed at which the upper and lower rotor systems are rotating, and this disintegration of the rotor blades results in rapid disintegration of the remaining elements of the rotor system due to the unbalanced nature of the upper and lower rotor systems, and the entire rotor structure quickly becomes unstable and self-destructs. This, of course, results in the helicopter falling from the sky and further results in the almost certain death of the pilot and crew of the helicopter. There is therefore a need for a system or device which will generally prevent accidental intermeshing of the upper and lower rotor systems.

There are several examples shown in the prior art which attempt to address and solve this problem with coaxial rotor systems, including such Patents as Scott, U.S. Pat. No. 7,210,651 issued May 1, 2007. Scott discloses a dual coaxial rotor system which includes an upper and lower rotor system with reduced axial rotor separation distance along a common axis by way of rotor tip position sensing and rotor position control to avoid tip contact. In fact, all of the prior art devices currently known follow a similar method of attempting to address and correct the problem of rotor tip contact between upper and lower rotor systems, but, of course, in extreme conditions, these systems can fail resulting in destruction of the upper and lower rotor systems. There is therefore a need for a structural physical system which will accomplish the purpose of separating the upper and lower rotor systems while simultaneously permitting and enhancing operation of the coaxial rotor system.

Therefore, an object of the present invention is to provide an improved coaxial rotor assembly for a helicopter.

Another object of the present invention is to provide an improved coaxial rotor system for a helicopter which includes upper and lower rotor systems and a circumferential rotor blade-engaging ring which extends around the upper and lower rotor systems and movably engages and secures the outer ends of the rotor blade of each of the upper and lower rotor systems such that the distance between the upper and lower rotor systems remains generally constant due to the mechanical connections of the upper and lower rotor blades to the circumferential ring thereby substantially eliminating all possibility of physical interaction between the upper and lower rotor systems.

Another object of the present invention is to provide an improved coaxial rotor system for a helicopter which is extremely strong yet light in weight so that the substantial benefits of use of the circumferential ring of the present invention are not literally outweighed by the added weight included in the system by use of the circumferential ring.

Finally, an object of the present invention is to provide an improved coaxial rotor assembly for a helicopter which is relatively simple in design, economical to manufacture, and is safe, efficient and effective in use.

SUMMARY OF THE INVENTION

The present invention provides an improved coaxial rotor assembly for a helicopter including an upper rotor system having a multiple of upper rotor blades each having outer tips, the upper rotor blades mounted on and extending outwards from a central rotor shaft and a lower rotor system having a multiple of lower rotor blades each having outer tips and mounted on and extending outwards from the central rotor shaft. The upper rotor system is spaced an axial distance from the lower rotor system on the central rotor shaft. Finally, a rotor blade support ring extends circumferentially around each of the upper and lower rotor systems movably engaging and supporting the outer tips of the upper and lower rotor blades in spaced apart relation such that the upper and lower rotor systems rotate in opposite directions and the rotor blade support ring prevents contact between the upper and lower rotor systems during operation thereof.

The present invention thus provides a substantial improvement over those systems and methods found in the prior art which are designed to prevent the upper and lower rotors of coaxial rotor systems from accidentally interacting. First of all, because the device for maintaining separation of the upper and lower rotor systems provides a structural physical barrier to the interaction of the two rotor systems, it is superior to those devices which are designed to sense improper proximity and only then react to try to prevent the interaction. Such devices can fail, whereas the present invention cannot unless structural failure of the ring occurs. Also, because the present invention provides a circumferential ring which effectively covers the outer tips of the rotor blades, it is safer for persons working on or with the helicopter to be around the helicopter, as accidental contact with the rotating blade tips is prevented. Perhaps most importantly from an operational standpoint, however, the present invention prevents interaction of the upper and lower rotor systems during extreme operation of the helicopter, and as it is during these maneuvers that rotor interaction is most likely to take place, the present invention will permit the operator of the helicopter to concentrate on flying the helicopter and not be concerned about potential interaction between rotor systems. It is therefore seen that the present invention provides a substantial improvement over those systems and methods found on the prior art.

DESCRIPTION OF THE PREFERRED EMBODIMENT

Figure 1:
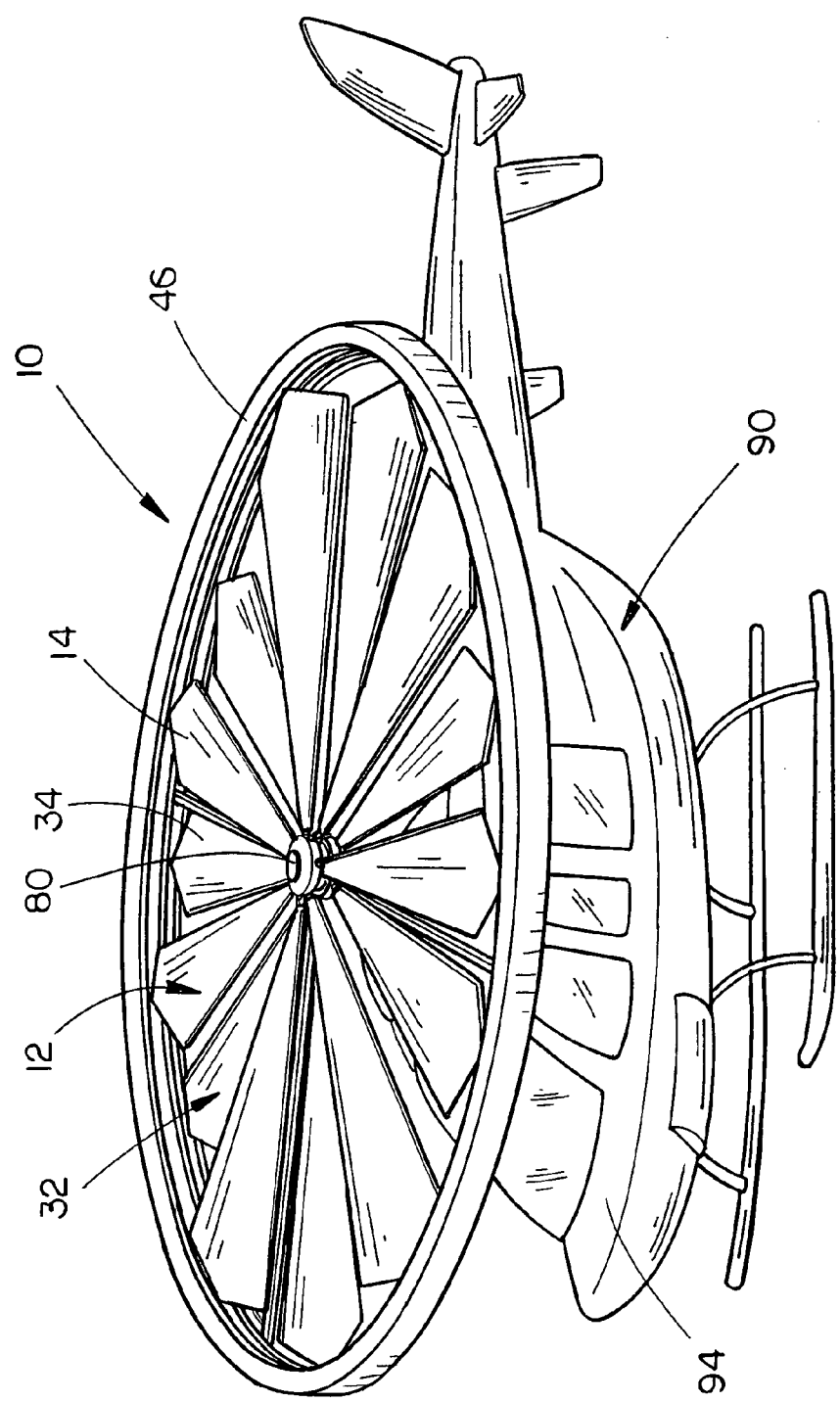
FIG. 1 is a perspective view of the improved coaxial rotor system of the present invention on a helicopter.

The improved coaxial rotor assembly 10 of the present invention is shown best in FIGS. 1-5 as including an upper rotor system 12 and a lower rotor system 32 each of which include a plurality of rotor blades, specifically a set of upper rotor blades 14 and a set of lower rotor blades 34. In the preferred embodiment, the upper and lower rotor systems 12 and 32 would each include approximately three to eight rotor blades 14 and 34, with the exact number, shape and size of the rotor blades to be determined by the specific design and performance requirements of the helicopter 90 with which the improved helicopter rotor assembly 10 of the present invention is to be used.

Of course, the improved helicopter rotor assembly 10 of the present invention would include all of the standard elements found in coaxial rotor assemblies, including the various control elements which control the pitch and yaw of the upper and lower rotor systems 12 and 32 and the power plant 92 operative to drive the upper and lower rotor systems 12 and 32 as mounted on the central rotor shaft 80. It should be noted that all of the various elements of the helicopter 90 which are provided to power and control the speed, pitch, angle, configuration of the upper and lower rotor systems 12 and 32, the upper rotor blades 14 and lower rotor blades 34 and the power plant 92 and the remaining operational elements of the helicopter 90 used with the improved helicopter rotor assembly 10 of the present invention would be understood by those skilled in the art of helicopter design, and therefore further discussion of those already well-known features is deemed unnecessary. It should be further noted, however, that although minimal discussion is undertaken in regards to those elements already well known in the prior art, those elements such as the power plant 92 and helicopter 90, particularly the fuselage 94 of helicopter 90, may be modified or changed in accordance with the teachings of the prior art to accommodate various purposes and uses as will be determined by manufacturers and users of the present invention. Therefore, such modifications should be understood to be a part of this disclosure.

Figure 2:
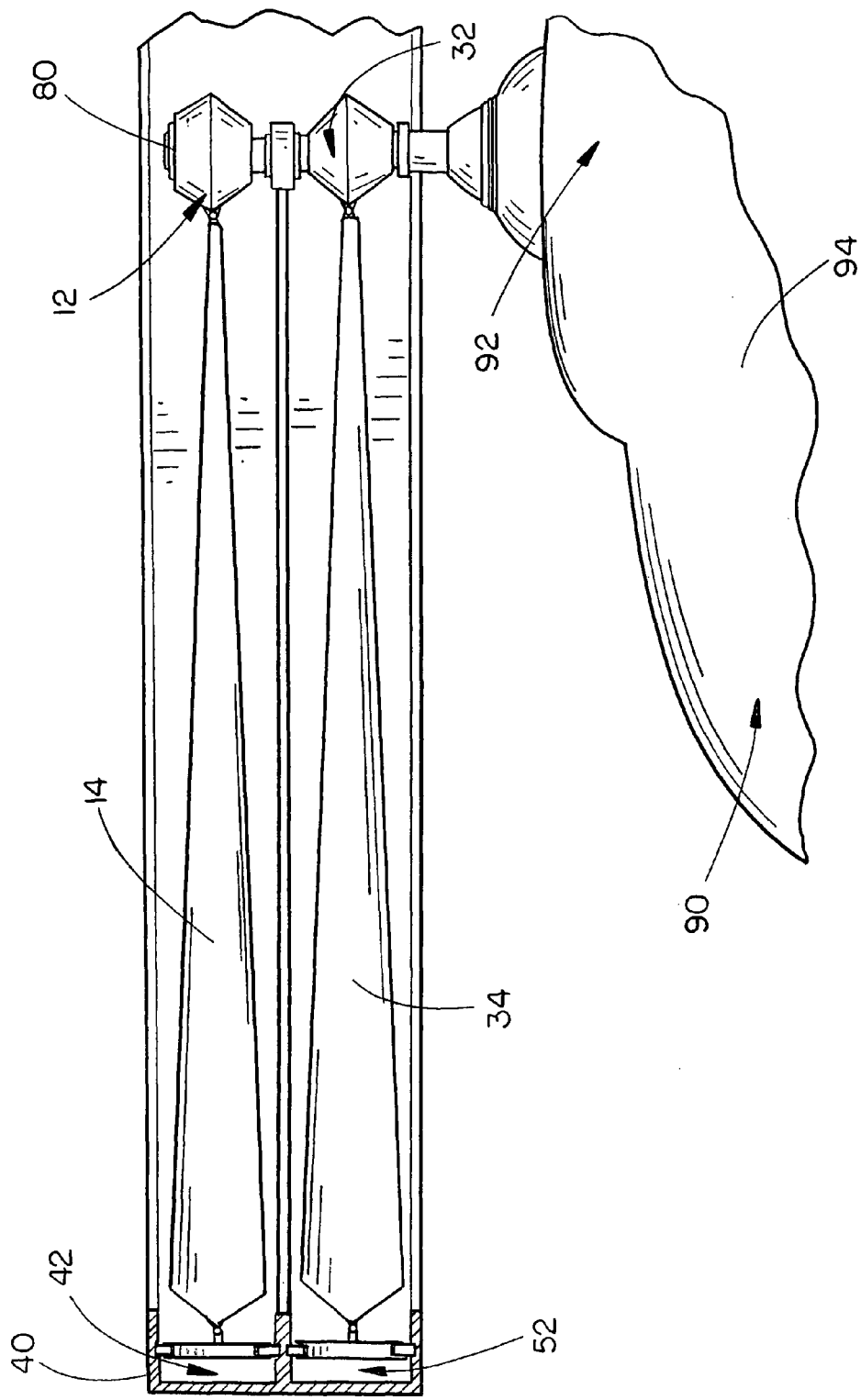
FIG. 2 is a detailed side elevational view of the system.
Figure 3:
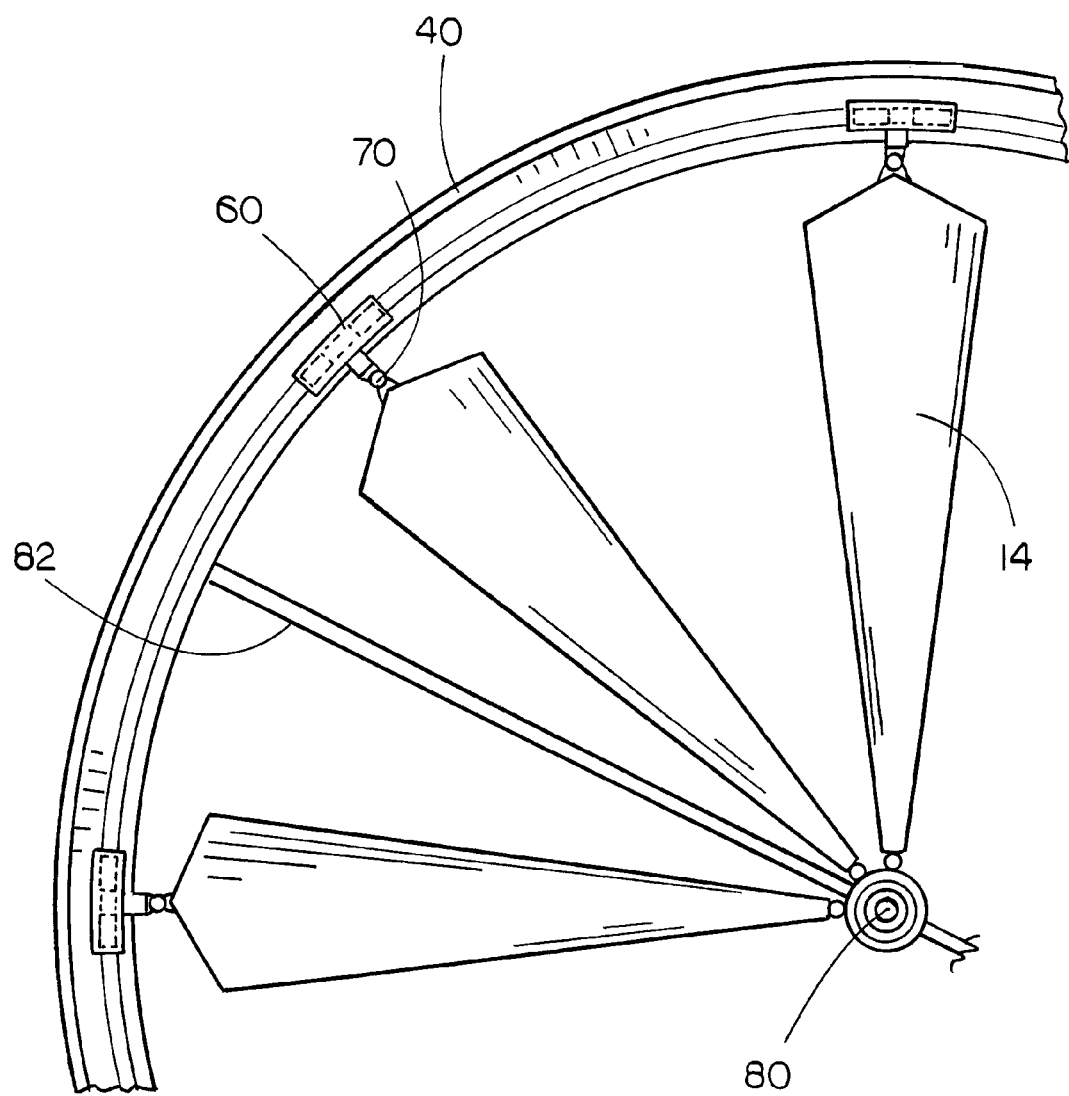
FIG. 3 is a detailed top plan view of the present invention.
Figure 4:
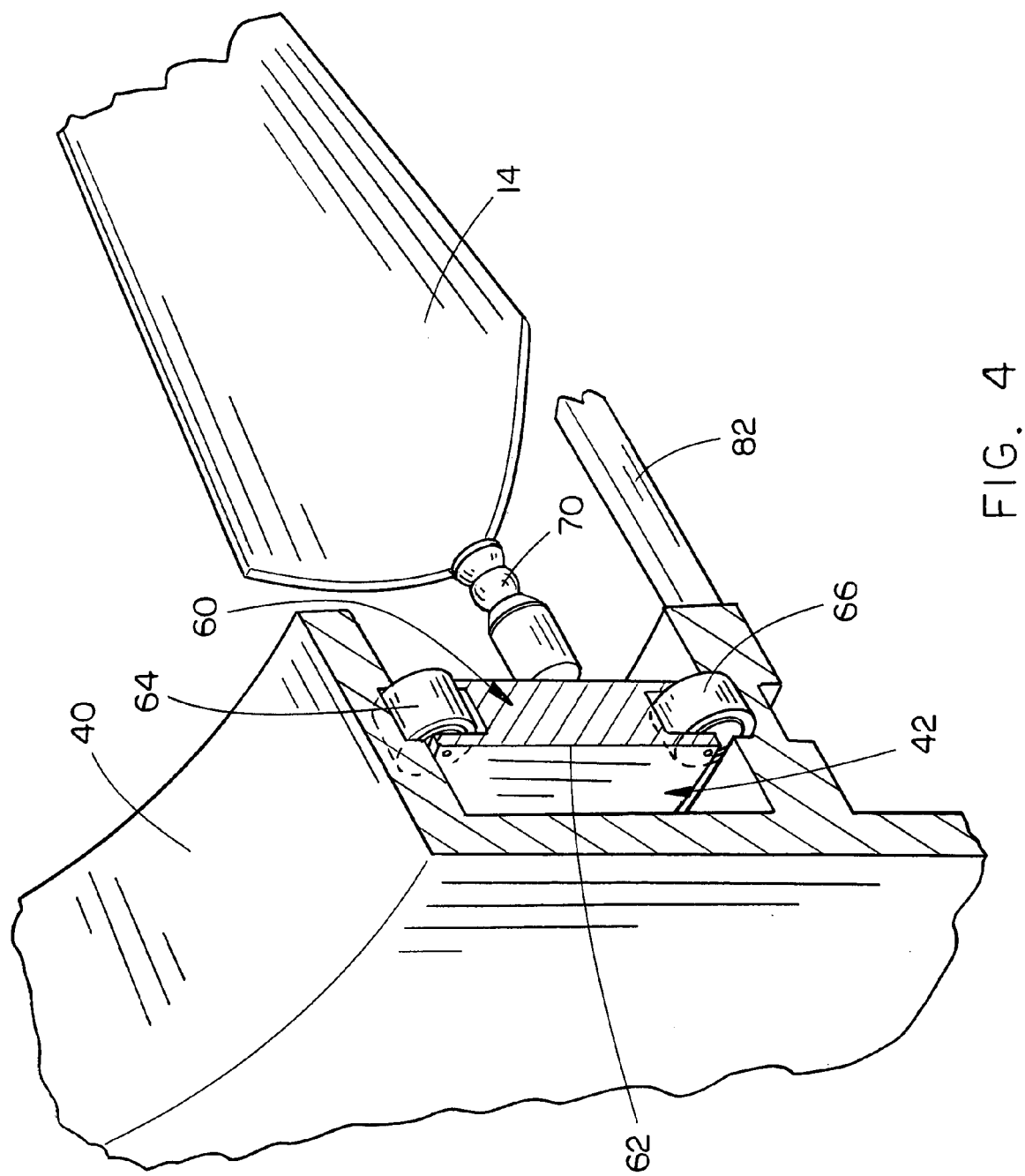
FIG. 4 is a detailed perspective view of the ring of the present invention.
Figure 5:
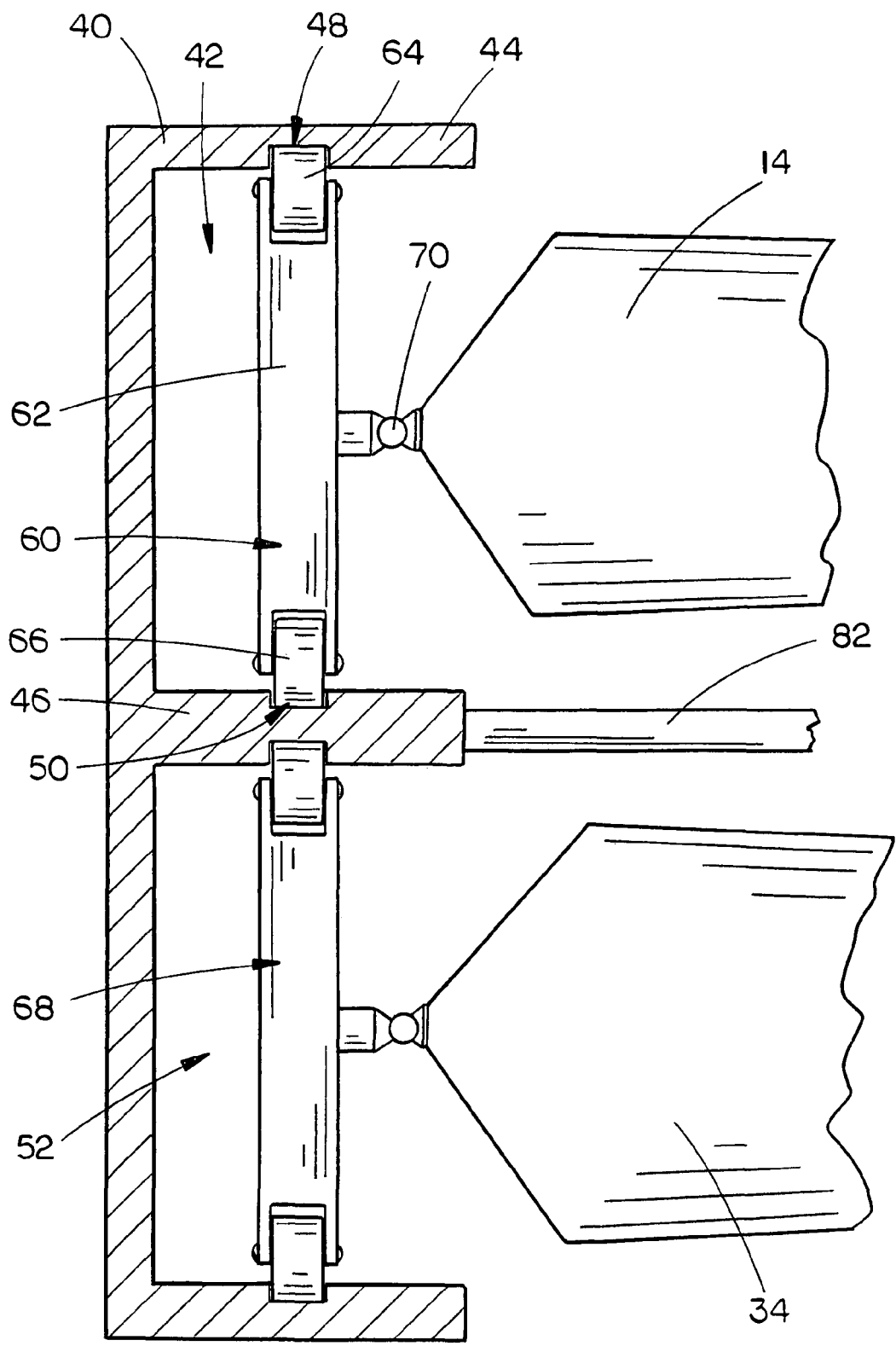
FIG. 5 is a detailed side elevational view of the ring and trolleys movably mounted therein.

The significant inventive feature of the improved helicopter rotor assembly 10 of the present invention is shown best in FIGS. 1-5 as including an outer circumferential ring 40 which is generally E-shaped in cross-sectional shape and which includes upper and lower channels 42 and 52, each of which would be substantially identical to one another, as shown best in FIGS. 2 and 4. Specifically, upper channel 42 would include a top wall 44 and base wall 46 (which also preferably forms the top wall of lower channel 52), each of which would include a wheel channel 48 and 50 formed therein which would preferably be generally rectangular in cross-sectional shape. Each of the upper rotor blades 14 would be connected to an upper rotor blade trolley 60 which, in the preferred embodiment, would include a generally rectangular trolley body 62 and upper and lower wheels 64 and 66 which are mounted on frictionless ball bearings and fit within the top wheel channel 48 and base wheel channel 50 of upper channel 42, as shown best in FIGS. 4 and 5. The connection of the upper rotor blade trolley 60 to upper rotor blade 14 would preferably be via a rotating ball joint 70 which permits the pitch of the upper rotor blade 14 to be modified while maintaining contact and connection between the upper rotor blade 14 and upper rotor blade trolley 60, and therefore this connecting joint 70 should be constructed of a tungsten-carbide steel material or other such high wear resistance and high strength construction material, as would the other elements of the improved helicopter rotor assembly 10.

It should further be noted that the outer circumferential ring 40 would be mounted on the central rotor shaft 80 via a plurality of ring support rods 82 which support the outer circumferential ring 40 in a generally fixed position such that as the upper rotor blade trolleys 60 travel around the outer circumferential ring 40 within upper channel 42, the arc described forms a perfect circle with a radius equal to the length of the upper rotor blade 14 plus the length of connection joint 70. Of course, due to the high temperatures and forces involved in the operation of the improved helicopter rotor assembly 10 of the present invention, it is expected that outer circumferential ring 40 would be constructed of an extremely light weight yet extremely durable graphite composite material or other such highly wear-resistant and heat-resistant construction material, as would be the ring support rods 82. Of course, it should be noted that several different types of construction materials may be used with the outer circumferential ring 40 and ring support rods 82 of the present invention so long as the intended functional features of the present invention are neither significantly degraded nor destroyed.

In operation, the upper and lower rotor blades 14 and 34 would rotate in opposite directions as per a standard coaxial rotor design, but this is important as there will be some frictional forces resulting from the upper and lower rotor blade trolleys 60 and 68 traveling within the upper and lower channels 42 and 52 of the outer circumferential ring 40. As these frictional forces will be in opposite directions due to the counter-rotational forces of the upper and lower rotor systems 12 and 32, the frictional forces should cancel out and the outer circumferential ring 40 should remain generally stable as the upper and lower rotor blades 14 and 34 rotate therewithin. The important consideration of the outer circumferential ring 40 comes into play when extreme aerobatic maneuvers are performed with a helicopter 90 outfitted with the improved helicopter rotor assembly 10 of the present invention. In an ordinary coaxial rotor assembly, the upper and lower rotor systems 12 and 32 would have to be spaced an axial distance to prevent accidental interaction of the upper and lower rotor blades 14 and 34 during such extreme maneuvering. However, with the present invention, specifically outer circumferential ring 40, the upper and lower rotor systems 12 and 32 will be placed much more closely together than that found in the prior art and this may be done without risking accidental interaction of the upper and lower rotor blades 14 and 34 as they are prevented from traveling anywhere outside of the predetermined plane of rotation as defined by the upper and lower channels 42 and 52 of outer circumferential ring 40. It is expected that this feature will allow the helicopter 90 to fly at a faster rate of speed and be far more maneuverable than those helicopters with coaxial rotor systems found in the prior art, as the operator need not worry that the extreme maneuvers or high rates of speed being pursued by the helicopter 90 will result in accidental interaction of the upper and lower rotor blades 14 and 34. This represents a significant and unique improvement over the prior art.

Figure 7:
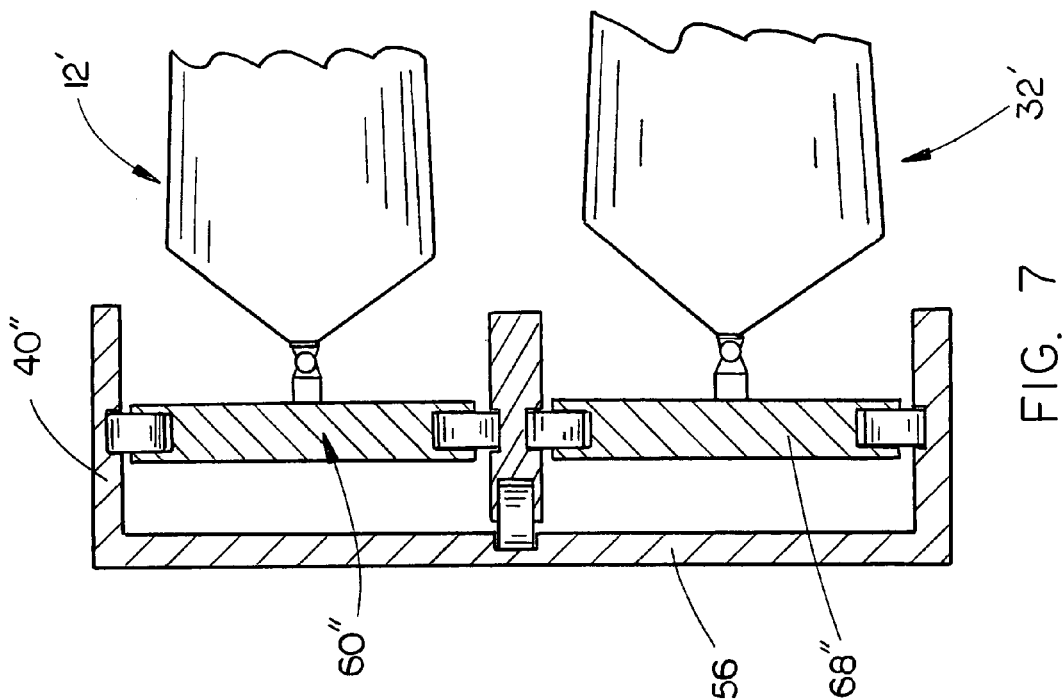
FIGS. 6 and 7 are detailed side elevational views of alternative embodiments of the outer ring of the system.
Figure 6:
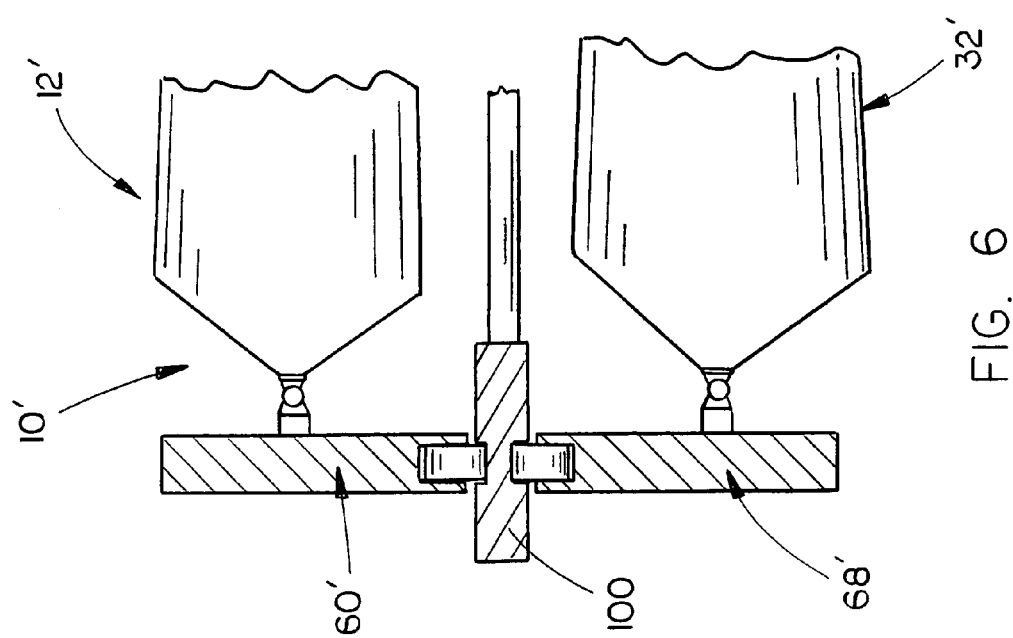
Figure 8:
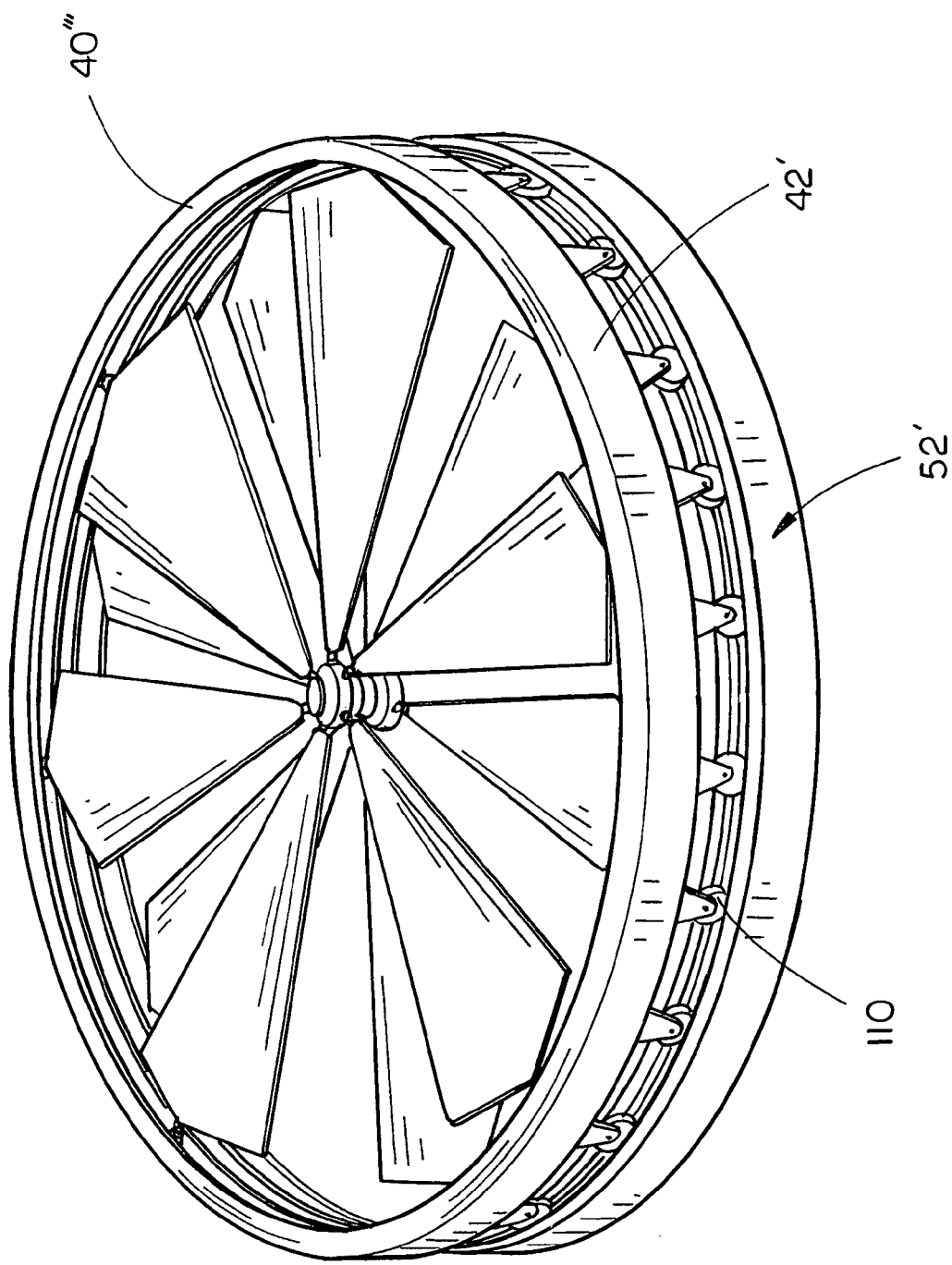
FIG. 8 is a perspective view of an alternative embodiment of the improved coaxial rotor system of the present invention.

FIGS. 6, 7, and 8 disclose alternative embodiments of the improved helicopter rotor assembly 10 of the present invention which are designed to address and solve problems or concerns which it is believed may arise through use of the present invention. Specifically, FIG. 6 shows an alternative embodiment of the improved helicopter rotor assembly 10' which replaces the outer circumferential ring 40 with a single circumferential ring plate 100 on which the upper and lower rotor blade trolleys 60' and 68' travel. In this embodiment, upwards deflection of the upper rotor system 12' and downwards deflection of the lower rotor system 32' is permitted, yet interaction between the upper and lower rotor systems 12' and 32' is prevented due to the physical structure of ring plate 100 positioned between the upper and lower rotor blade trolleys 60' and 68'.

FIG. 7 discloses an alternative embodiment of the outer circumferential ring 40' in which the outer wall 56 may move freely relative to the upper and lower rotor blade trolleys 60" and 68", and such a configuration may be desirable in situations where the upper and lower rotor systems 12' and 32' are of sufficient strength and stability to provide independent support for the outer circumferential ring 40" mounted thereon, thereby eliminating the need for the ring support rods 82 as was described previously.

Finally, FIG. 8 discloses a third alternative embodiment of the outer circumferential ring 40''' in which the upper and lower channels 42' and 52' may rotate relative to one another. Such a configuration may be desirable when independent speed and rotation of the upper and lower rotor systems 12' and 32' is mandated, and the upper and lower channels 42' and 52' would preferably be separated by spacing wheel units 110 as shown in FIG. 8.

There are several significant advantages available to the helicopter operator when operating a helicopter outfitted with the improved coaxial rotor assembly 10 of the present invention. For example, the helicopter would be to be able to rotate to face any direction, even while standing still in the air. Furthermore, since the improved coaxial rotor assembly 10 substantially prevents not only interaction between the upper and lower rotor systems 12 and 32, but also prevents the rotor systems 12 and 32 from impacting external objects such as trees, poles, wires, etc., helicopters such as military helicopters can fly in the woods and the jungle between the high trees without fear of rotor impact. The present invention can include increased safety by adding some protective metal rods to the top and bottom of the outer circumferential ring 40 for deflecting tree branches and the like, if so desired. Also, as the present invention uses two rotors instead of one, it generates greater lift so it can use a smaller rotor radius than other helicopters, thus permitting the helicopter to fly in tighter spaces such as between close trees and within narrower passages between buildings. Also, having greater lift capacity means that the helicopter can reach higher altitudes when necessary, like passing over mountain zones in an easier manner than that possible with other helicopters or climbing faster during combat or while undergoing evasive maneuvers. Finally, because the same amount of lift can be generated using lower rotation speeds, as compared with a single rotor helicopter, the operating lifespan for the rotor and helicopter parts will be increased due to the decreased wear and tear on the parts.

It is to be understood that numerous additions, modifications and substitutions may be made to the improved helicopter rotor assembly 10 of the present invention which fall within the intended broad scope of the appended claims. For example, the size, shape and construction materials used in connection with the improved helicopter rotor assembly 10 may be modified or changed so long as the intended functional features of the present invention are neither significantly degraded nor destroyed. Furthermore, the precise configuration of the outer circumferential ring 40 or ring plate 100 may be modified or changed so long as the intended purpose of maintaining physical separation between the upper and lower rotor systems 12 and 32 via a physical structure is maintained. Finally, although the present invention has been shown as being used in connection with helicopters, the present invention may be used in connection with many different types of rotor-driven aircraft, and such usages would be understood by those skilled in the art of such aircraft design.

There has therefore been shown and described an improved helicopter rotor assembly 10 which accomplishes at least all of its intended objectives.

I claim:

1. An improved coaxial rotor assembly for a helicopter comprising:

an upper rotor system having a multiple of upper rotor blades each having outer tips and mounted on and extending outwards from a central rotor shaft means;

a lower rotor system having a multiple of lower rotor blades each having outer tips and mounted on and extending outwards from said central rotor shaft means;

said upper rotor system spaced an axial distance from said lower rotor system on said central rotor shaft;

rotor blade support ring means extending circumferentially around each of said upper and lower rotor systems movably engaging and supporting said outer tips of said upper and lower rotor blades in spaced apart relation such that said upper and lower rotor systems are rotatable in opposite directions and said rotor blade support ring means prevents contact between said upper and lower rotor systems during operation thereof.

2. The improved coaxial rotor assembly of claim 1 wherein said rotor blade support ring means comprises an outer circumferential ring which is generally E-shaped in cross-sectional shape including upper and lower channels within which a multiple of upper and lower rotor blade trolleys are respectively movably retained.

3. The improved coaxial rotor assembly of claim 2 further comprising a multiple of connecting joints, each of said multiple of connecting joints extending between one of said outer tips of said multiple of upper and lower rotor blades and one of said multiple of upper and lower rotor blade trolleys, said multiple of connecting joints each operative to permit the pitch of said upper and lower rotor blades to be adjusted while maintaining contact and connection between said upper and lower rotor blades and said upper and lower rotor blade trolleys.

4. The improved coaxial rotor assembly of claim 3 further comprising a plurality of ring support rods mounted on said central rotor shaft means and extending radially outwards therefrom to connect to and support said outer circumferential ring in a generally fixed position whereby as said upper and lower rotor blade trolleys travel around said outer circumferential ring, the arc described forms a perfect circle with a radius equal to the length of said upper and lower rotor blades plus the length of said connection joint.

5. The improved coaxial rotor assembly of claim 2 wherein said upper and lower channels of said outer circumferential ring each include a top wall and a base wall, each of which would include a wheel channel formed therein extending concentrically with said outer circumferential ring.

6. The improved coaxial rotor assembly of claim 5 wherein each of said upper rotor blades and said lower rotor blades are connected to a rotor blade trolley which includes a trolley body and upper and lower wheels mounted thereon which fit within said wheel channels in said top wall and said base wall.

7. The improved coaxial rotor assembly of claim 6 wherein said connection of each of said upper rotor blades and said lower rotor blades to said rotor blade trolley comprises a rotating ball joint operative to permit adjustment of the pitch of each of said upper rotor blades and said lower rotor blades while maintaining contact and connection therebetween.

8. An improved coaxial rotor assembly for a helicopter comprising:
an upper rotor system having a multiple of upper rotor blades each having outer tips and mounted on and extending outwards from a central rotor shaft means;
a lower rotor system having a multiple of lower rotor blades each having outer tips and mounted on and extending outwards from said central rotor shaft means;
said upper rotor system spaced an axial distance from said lower rotor system on said central rotor shaft;
rotor blade support ring means extending circumferentially with each of said upper and lower rotor systems;
a multiple of upper and lower rotor blade trolleys each mounted on one of said outer tips of respective ones of said upper and lower rotor blades;
said multiple of upper and lower rotor blade trolleys engaging separate sections of said rotor blade support ring means such that as said upper and lower rotor blades are rotated, said rotor blade support ring means cooperates with said multiple of upper and lower rotor blade trolleys to prevent contact between said upper and lower rotor systems.

9. The improved coaxial rotor assembly of claim 8 wherein said rotor blade support ring means comprises an outer circumferential ring which is generally E-shaped in cross-sectional shape including upper and lower channels within which a multiple of upper and lower rotor blade trolleys are respectively movably retained.

10. The improved coaxial rotor assembly of claim 8 wherein said rotor blade support ring means comprises a circumferential ring plate positioned between said upper and lower rotor blade trolleys whereby upwards deflection of said upper rotor system and downwards deflection of said lower rotor system is permitted, yet interaction between said upper and lower rotor systems is prevented due to said ring plate preventing said upper and lower rotor blade trolleys from contacting one another.

11. The improved coaxial rotor assembly of claim 9 further comprising a multiple of connecting joints, each of said multiple of connecting joints extending between one of said outer tips of said multiple of upper and lower rotor blades and one of said multiple of upper and lower rotor blade trolleys, said multiple of connecting joints each operative to permit the pitch of said upper and lower rotor blades to be adjusted while maintaining contact and connection between said upper and lower rotor blades and said upper and lower rotor blade trolleys.

12. The improved coaxial rotor assembly of claim 11 further comprising a plurality of ring support rods mounted on said central rotor shaft means and extending radially outwards therefrom to connect to and support said outer circumferential ring in a generally fixed position whereby as said upper and lower rotor blade trolleys travel around said outer circumferential ring, the arc described forms a perfect circle with a radius equal to the length of said upper and lower rotor blades plus the length of said connection joint.

13. The improved coaxial rotor assembly of claim 9 wherein said upper and lower channels of said outer circumferential ring each include a top wall and a base wall, each of which would include a wheel channel formed therein extending concentrically with said outer circumferential ring.

14. The improved coaxial rotor assembly of claim 13 wherein each of said upper rotor blades and said lower rotor blades are connected to a rotor blade trolley which includes a trolley body and upper and lower wheels mounted thereon which fit within said wheel channels in said top wall and said base wall.

15. The improved coaxial rotor assembly of claim 14 wherein said connection of each of said upper rotor blades and said lower rotor blades to said rotor blade trolley comprises a rotating ball joint operative to permit adjustment of the pitch of each of said upper rotor blades and said lower rotor blades while maintaining contact and connection therebetween.

16. An improved coaxial rotor assembly for a helicopter comprising:
an upper rotor system having a multiple of upper rotor blades having outer ends and mounted on and extending outwards from a central rotor shaft means;
a lower rotor system having a multiple of lower rotor blades having outer ends and mounted on and extending outwards from said central rotor shaft means;
said upper rotor system spaced an axial distance from said lower rotor system on said central rotor shaft;
rotor blade support ring means extending circumferentially with each of said upper and lower rotor systems generally adjacent the outer ends thereof, said rotor blade support ring means operative to permit said upper and lower rotor systems to be rotated in opposite directions and physically prevent contact between said upper and lower rotor systems during rotation of said upper and lower rotor systems.

* * * * *